3,641,184
OLEFIN ISOMERIZATION
Clifford E. Smith and Bobby J. White, Bartlesville, Okla.,
assignors to Phillips Petroleum Company
No Drawing. Filed Dec. 16, 1969, Ser. No. 885,629
Int. Cl. C07c 5/22
U.S. Cl. 260—683.2                                      12 Claims

ABSTRACT OF THE DISCLOSURE

An olefin is isomerized by contact with a catalyst formed from a supported nickel complex associated with an aluminum compound.

---

This invention relates to a process for the double bond isomerization of olefins.

The conversion of olefinic hydrocarbons to other olefinic products is an operation which is desirable in a number of situations. For instance, the more plentiful olefins can be converted to less plentiful olefins. This invention describes a process for converting certain olefinic hydrocarbons to others by isomerization.

Many catalysts are known to the art which will shift the double bonds of olefins, particularly the double bonds of butenes. However, most such catalysts require high temperatures. It now has been found that the present catalyst system is quite active at moderate temperature such as room temperature.

The isomerization temperature is of interest because the equilibrium of the butene double bond isomers is temperature dependent. At low temperatures, the equilibrium is very much in favor of butene-2. Hence, if high concentrations of butene-2 are desirable, the isomerization should be conducted at as low a temperature as possible.

Further, double bond isomerization is sometimes desirable for a particular disproportionation reaction. For example, butene-2 can react with isobutene to make isoamylene, but butene-1 reacts with isobutene to make isohexene. Thus, if isoamylene is the desired product, a mixed $C_4$ feed stream can be passed first through a double bond isomerization process at low temperature to maximize the concentration of butene-2.

Accordingly, it is an object of this invention to provide a process for the isomerization of olefins.

Other objects, advantages and features of this invention will be apparent to one skilled in the art from the following disclosure and the appended claims.

It now has been found that monoolefins having 4 to 20 carbon atoms per molecule can be isomerized in respect to the position of the double bond by contacting the olefin with a supported nickel complex associated with an aluminum compound. It has been found that by supporting the nickel complex and the aluminum compound on a solid support such as silica, unexpectedly high conversions to isomers of the starting olefinic hydrocarbon are obtained.

The olefinic hydrocarbons that can be employed in this invention are isomerizable monoolefins having from 4 to 20 carbon atoms per molecule. These olefinic hydrocarbons can be branched or unbranched and acyclic or cyclic.

Specific examples of the olefinic hydrocarbons are: butene-1, butene-2, pentene-1, pentene-2, 3-methylpentene-1, 2,3-dimethylbutene-1, hexene-2, heptene-3, octene-1, 2-ethylhexene-1, decene-1, dodecene-3, 3-methylcyclopentene, 4-isobutylcyclohexene, 3,4,6-triethylcyclooctene, 4-methyl-6-ethyltridecene-1, eicosene-1, and the like, and mixtures thereof.

The nickel complexes of the catalyst system of this invention are hydrocarbon-soluble organic complexes of nickel wherein the nickel atoms are divalent, monovalent or zerovalent.

Preferred nickel complexes are represented by the formula $L_2NiZ_2$ wherein each L is a ligand which is covalently coordinated to the nickel atoms through a suitable electron donor atom and each Z is an anion which is ionically bonded to the nickel atom. In some instances, Z can be part of the structure of L.

A still more preferred group of nickel complexes is represented by the formula $(R_3Q)_2NiX_2$ wherein each R is selected from an alkyl, alkenyl, cycloalkyl or aryl radical, or a combination thereof such as alkaryl or aralkyl radical, having up to 20 carbon atoms; Q is phosphorus, arsenic or antimony, preferably phosphorus; and each X is chlorine, bromine, or iodine, preferably chlorine.

Specific examples of the nickel complexes are:

bis(tri-n-butylphosphine)dichloronickel
bis(triphenylphosphine)dichloronickel
bis(pyridine)dichloronickel
bis(triphenylphosphine oxide)dibromonickel
bis(triphenylarsine oxide)dibromonickel
bis(3-picoline)diiodonickel
bis(4-picoline)diiodonickel
bis(4-ethylpyridine)difluoronickel
tris(2,4-pentanedionato)nickel
bis(cyclopentadienyl)nickel
bis($\pi$-allyl)iodonickel
triphenylphosphine($\pi$-allyl)iodonickel
bis(tribenzylarsine)dibromonickel
bis(tri-o-xylylstibine)diiodonickel
bis(trieicosylphosphine)diacetatonickel
bis(triphenylphosphine)nitrosyliodonickel
bis(N,N-di-n-butyldithiocarbamato)nickel
bis(N,N-dimethyl-$\beta$-mercaptoethylamine)nickel
bis(2-picoline-N-oxide)dinitratonickel
bis[N,N-dicyclohexyl-2-(cyclohexylamino)malonamide]dichloronickel
bis(diphenylchlorophosphine)2,4-pentanedionatonickel
bis(tricyclohexylphosphine oxide)dibromonickel
bis(n-tridecyl-$\beta$-mercaptoethylamine)nickel, and the complex nickel salts of 2-hydroxy-4,4'-didodecylbenzophenone
2-hydroxy-4-methylbenzophenone
3,4-di-t-butylsalicylaldehyde
o,o'-thiobis(p-1,1,3,3-tetramethylbutylphenol)
N-salicylidene-4-methylcyclohexylamine and the like and mixtures thereof.

The aluminum compounds of the catalyst system of this invention are represented by the formula $R_nAlX_m$ wherein R and X are as previously defined; n is 0 or the integer 1 or 2, m is the integer 1, 2 or 3; and the sum of $n+m$ equals 3. Preferred aluminum compounds are those wherein n is the integer 1 or 2 and m is the integer 1 or 2.

Specific examples of the aluminum compounds are: aluminum trichloride, dimethylaluminum bromide, phenylaluminum diiodide, di(2-ethylhexyl)aluminum fluoride, benzylaluminum chloride, aluminum tribromide, cyclohexylaluminum dichloride, eicosylaluminum diiodide, didecylaluminum chloride, and the like, and mixtures thereof. Particularly effective aluminum compounds are lower alkylaluminum chlorides, particularly diethylaluminum chloride, ethylaluminum dichloride, and methylaluminum sesquichloride.

The soluble components of the catalyst system are usually present in the range of 0.1 to 20, preferably 1 to 10, and still more preferably, 2 to 6, moles of aluminum compound per mole of nickel complex. Catalyst poisons such as traces of water in the system can be scavanged by employing even greater proportions of the aluminum compound.

The solid supports that can be employed in this invention are generally difficult to reduce metal oxides of a catalytic grade. Catalytic grade supports are materials having a surface area of at least 50 and preferably at least 100 square meters per gram. The supports, when slurried with distilled and decarbonated water, exhibit a pH below 6, preferably below 4. Specific examples are silica, alumina, silica-alumina, titania, boria, zirconia, and the like, and mixtures thereof.

While these supports can contain minor amounts of other metal oxides, they must not contain sufficient amounts of alkali metal oxides to produce a slurry with a pH greater than 6. The solid supports are heat-treated before forming the catalyst by calcination in flowing air at a temperature ranging from 800 to 1500° F. for a time ranging from 0.1 to 24 hours.

The catalyst system of this invention can be prepared in a number of different ways. One method is to pass a hydrocarbon solution of the nickel complex through a bed of the heat-treated support such that the nickel complex is adsorbed onto the solid. With or without evaporation of the residual solvent, a hydrocarbon solution of an aluminum compound is also adsorbed onto the solid. The order of contacting can be reversed, if desired, but it is preferred to contact the solid with the nickel complex first.

Another method is to form the catalyst complex in situ on the solid support. Thus, a bed of the preactivated solid support can be treated first with a simple nickel compound such as a nickel halide salt and then with the desired complexing agent to form the desired nickel complex. Finally, the aluminum compound can be applied.

Still another way is to separately meter each of the three components of the catalyst system into the reaction zone such that the solid catalyst composition is formed in situ.

Still another method of forming a catalyst system is to add the nickel complex and the aluminum compound to the solid support in the presence of a diluent such that a slurry is formed. The slurry then can be pumped to the reaction zone of a batch or continuous process.

In still another method of forming the catalyst system, a slurry can be made from a solid support, nickel complex and a suitable solvent. The slurry then can be pumped into the reaction zone and contacted with the olefin before the addition of the aluminum compound, as it is sometimes desirable that the nickel complex be contacted with the olefin before contact with the aluminum compound. Examples of suitable solvents or diluents are benzene, cyclohexane, chlorobenzene, methylene chloride, ethylene chloride, and the like.

The solid supports of this invention have been found to have affinity for the nickel complex and for the aluminum compound of the catalyst system. The proportion of the nickel complex to the solid support cannot be greater than that which the solid support can conveniently adsorb. This maximum level can vary depending upon the specific support and the specific nickel complex employed.

One method of determining this maximum level is to pass a solution of the nickel complex through a bed of the solid support until no more of the nickel complex is adsorbed. The quantity of nickel complex retained on the solid support is then determined by conventional analytical techniques. Once such a maximum level has been determined, the nickel complex and the solid support can be combined more simply by any of the preceding methods of preparing the catalyst system. Ordinarily, it is preferred that the solid support not be saturated with the nickel complex or the aluminum compound but only from 10 to 90 percent of the amount sufficient to saturate the solid is ordinarily used. To illustrate this, a particular catalyst grade silica was found to adsorb a maximum of about 6.35 weight percent of the tri(n-butylphosphine)dichloronickel based upon the weight of the support. Subsequently, only a quantity of this nickel complex amounting to about 5 weight percent based upon the solid support was used in the preparation of the catalyst system.

The olefin isomerization process of this invention can be carried out by using a number of conventional contacting techniques. The solid catalyst system can be used as a mobile catalyst system either in the presence of a suitable diluent, as a slurry catalyst operation or in the absence of any diluent and in the gas phase, or as a fluidized catalyst bed operation. These modes of reaction are conventional and can be carried out either continuously or batchwise. In the slurry form operation, suitable solvents or inert materials such as paraffinic or aromatic hydrocarbons or their halogenated derivatives can be employed. If desired, the support of catalyst system of the present invention can be formed into a fixed catalytic bed through which the feed olefin can be passed either with or without a diluent. The preferred mode, however, is the slurry form of operation.

The isomerization of the olefin or a mixture of olefins can take place at temperatures within the range of $-50$ to $225°$ F., preferably within the range of $32–150°$ F. Normally, it is desirable to carry out the isomerization reaction under pressures ranging up to 2000 p.s.i.g., preferably from 20 to 500 p.s.i.g., including atmospheric pressure. The time of contact of the olefin with the catalyst ranges from 0.1 minute to 20 hours in the liquid or vapor phase. Ordinarily, from 0.00001 to 0.1 mole of the nickel complex is employed for each mole of the olefin feed.

After completion of the reaction, or after removing the effluent from the reaction zone, the catalyst system of this invention can be removed from the product by simple filtration or decantation.

The advantages of this invention are further illustrated by the following examples. The reactants and the proportions and other specific conditions are presented as being typical and should not be construed to limit the invention unduly.

EXAMPLE I

In this example, about 1.0 cc. of silica-supported bis(tri-n-butylphosphine)dichloronickel/diethylaluminum chloride catalyst was used to isomerize butene-1 in a continuous reaction by passing the olefin feed stream through a fixed bed of the catalyst.

The catalyst was prepared by adsorbing bis(tri-n-butylphosphine)dichloronickel onto a particulate silica gel support which had a pH value of about 3.3 when slurried with distilled and decarbonated water. Sufficient nickel complex was adsorbed to amount to about 4.5% of the weight of the silica gel solid and this amount was about 80% of the maximum which could have been adsorbed by this solid. After the nickel complex had been adsorbed, the solid was again treated with diethylaluminum chloride in an amount sufficient to provide an Al:Ni ratio of about 6:1.

The butene-1 feed was passed through the reactor at 2800 cc. per hour, at room temperature, and at atmospheric pressure. By sampling and analysis, the conversion of butene-1 to butene-2 was found to be 85.4%.

These unexpected isomerizations results were not obtained by testing the silica gel alone, or by testing the silica gel upon which only the nickel complex was adsorbed, or by testing the silica gel upon which only the diethylaluminum chloride was adsorbed, even though the other conditions are comparable. Thus, to achieve the desirable isomerization results in the present invention, the catalyst system requires the presence of each of the three components, namely the solid support, the nickel complex and the aluminum compound.

EXAMPLE II

About 1 cc. of a catalyst, prepared in a manner essentially identical to that of Example I, was added to 0.3 cc. of heptene-3 and 1.0 cc. of pentane. This mixture was stirred under nitrogen at room temperature for about 42 minutes. Analysis of the feed and the resulting reaction mixture showed the following on a pentane-free basis. The feed composition consisted of 94% heptene-3 and 6% of heptene-2 and heptene-1. The effluent composition consisted of 58% heptene-3 and 42% heptene-2 and heptene-1.

This data shows that heptene-3 can also be effectively isomerized by the catalyst system of this invention.

Although this invention has been described in considerable detail, it must be understood that such detail is for the purpose of illustration only and many variations and modifications can be made by one skilled in the art without departing from the scope and spirit thereof.

We claim:

1. A process for the isomerization of monoolefins having from 4 to 20 carbon atoms per molecule which comprises contacting said olefin, under isomerization conditions, with a catalyst formed by the admixture of a hydrocarbon soluble nickel complex; an aluminum compound represented by the formula $R_nAlX_m$ wherein each R is selected from an alkyl, alkenyl, cycloalkyl or aryl radical, or a combination thereof having up to 20 carbon atoms; X is chlorine, bromine or iodine; $n$ is 0 or the integer 1 or 2, $m$ is the integer 1, 2 or 3; and the sum of $n+m$ equals 3; and a difficult to reduce metal oxide solid support, wherein said support, when slurried with distilled and decarbonated water, exhibits a pH below 6 and wherein said support is heated before said catalyst is formed with flowing air at a temperature ranging from 800° F. to 1500° F. for a period of time ranging from 0.1 to 24 hours.

2. A process according to claim 1 wherein said olefin has from 4 to 10 carbon atoms, said $n$ is the integer 1 or 2, said $m$ is the integer 1 or 2, and said support exhibits a pH below 4.

3. A process according to claim 1 wherein said olefin is butene-1 or heptene-3, said aluminum compound is diethylaluminum chloride, ethylaluminum dichloride or methylaluminum sesquichloride, and said support is silica, alumina, silica-alumina, titania, boria or zirconia.

4. A process according to claim 1 wherein said aluminum compound is diethylaluminum chloride and said support is silica.

5. A process according to claim 1 wherein the temperature ranges from −50 to 225° F., the pressure ranges up to 500 p.s.i.g., the reaction time ranges from 0.1 minute to 20 hours, the mole ratio of said nickel complex to said olefin ranges from 0.00001:1 to 0.1:1, and the mole ratio of said aluminum compound to said nickel complex ranges from 0.1:1 to 20:1.

6. A process according to claim 1 wherein the pressure is atmospheric pressure.

7. A process according to claim 1 wherein said nickel complex is represented by the formula $L_2NiZ_2$ wherein each L is a ligand which is covalently coordinated to the nickel atom through an electron donor, each Z is an anion which is ionically bonded to the nickel atoms, and Z can be a part of the structure of L.

8. A process according to claim 1 wherein said nickel complex is represented by the formula $(R_3Q)_2NiX_2$ wherein R and X are as defined in claim 1 and Q is phosphorus, arsenic or antimony.

9. A process according to claim 1 wherein said nickel complex is bis(tri-n-butylphosphine)dichloronickel.

10. A process for the isomerization of monoolefins having from 4 to 20 carbon atoms per molecule which comprises contacting said olefin, under isomerization conditions, with a catalyst formed by the admixture of a hydrocarbon soluble nickel complex represented by the formula $(R_3Q)_2NiX_2$, wherein R is selected from alkyl, alkenyl, cycloalkyl, or aryl radical or a combination thereof having up to 20 carbon atoms, X is chlorine, bromine or iodine, Q is phosphorus, arsenic or antimony; an aluminum compound represented by the formula $R_nAlX_m$ wherein each R is selected from an alkyl, alkenyl, cycloalkyl or aryl radical, or a combination thereof having up to 20 carbon atoms; X is chlorine, bromine or iodine; $n$ is 0 or the integer 1 or 2, $m$ is the integer 1, 2 or 3; and the sum of $n+m$ equals 3; and a solid silica, alumina, or a silica-alumina support, wherein said support, when slurried with distilled and decarbonated water, exhibits a pH below 6 and wherein said support is heated before said catalyst is formed with flowing air at a temperature ranging from 800° F to 1500° F. for a time period of from 0.1 to 24 hours.

11. The process for the isomerization of monoolefins selected from the class consisting of butene-1 and heptene-3 which comprises contacting said olefin under isomerization conditions, with a nickel complex represented by the formula $(R_3Q)_2NiX_2$ where each R is selected from alkyl, alkenyl, cycloalkyl, or aryl radical or a combination thereof having up to 20 carbon atoms, X is chlorine, bromine or iodine; diethylaluminum chloride; and a solid silica support wherein said support when slurried with distilled and decarbonated water exhibits a pH below 6 and wherein said support is heated before said catalyst is formed with flowing air at a temperature ranging from 800° F. to 1500° F. for a time period of from 0.1 to 24 hours.

12. A process in accord with claim 1 wherein said support is silica, alumina, silica-alumina.

References Cited
UNITED STATES PATENTS

| | | | |
|---|---|---|---|
| 3,471,581 | 10/1969 | Maxfield | 260—666 |
| 3,489,731 | 1/1970 | Imoto et al. | 260—683.2 |
| 3,485,892 | 12/1969 | Griffin et al. | 260—666 |

DELBERT E. GANTZ, Primary Examiner

V. O'KEEFE, Assistant Examiner